(12) United States Patent
Kuwabara

(10) Patent No.: US 10,325,709 B2
(45) Date of Patent: Jun. 18, 2019

(54) POWER TRANSMISSION DEVICE

(71) Applicant: SINFONIA TECHNOLOGY CO., LTD., Tokyo (JP)

(72) Inventor: Hideaki Kuwabara, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 188 days.

(21) Appl. No.: 15/543,315

(22) PCT Filed: Jan. 8, 2016

(86) PCT No.: PCT/JP2016/050495
§ 371 (c)(1),
(2) Date: Jul. 13, 2017

(87) PCT Pub. No.: WO2016/114230
PCT Pub. Date: Jul. 21, 2016

(65) Prior Publication Data
US 2018/0005745 A1   Jan. 4, 2018

(30) Foreign Application Priority Data
Jan. 13, 2015   (JP) .................... 2015-004265

(51) Int. Cl.
*H01F 7/20*   (2006.01)
*F16D 27/10*   (2006.01)
(Continued)

(52) U.S. Cl.
CPC ............. *H01F 7/206* (2013.01); *F16D 27/10* (2013.01); *F16D 27/112* (2013.01); *H01F 7/04* (2013.01);
(Continued)

(58) Field of Classification Search
CPC . H01F 7/206; H01F 7/204; H01F 7/04; H01F 2007/208; F16D 27/112
See application file for complete search history.

(56) References Cited

U.S. PATENT DOCUMENTS

| 6,366,000 | B1 * | 4/2002 | Higashino ................ H02K 3/12 310/208 |
| 2004/0066098 | A1 * | 4/2004 | Doherty .................... H02K 1/24 310/52 |

(Continued)

FOREIGN PATENT DOCUMENTS

JP   S58-047579     3/1983
JP   2005-188559 A  7/2005
(Continued)

OTHER PUBLICATIONS

International Search Report dated Apr. 5, 2016, issued in counterpart International Application No. PCT/JP2016/050495 (2 pages).
(Continued)

*Primary Examiner* — Daniel Kessie
(74) *Attorney, Agent, or Firm* — Westerman, Hattori, Daniels & Adrian, LLP

(57) ABSTRACT

There is provided a power transmission device to switch a coupled state and an uncoupled state between a first member and a second member which are arranged in a transmission path of a driving force to thereby control transmission of the driving force. The device includes a movable body having ferromagnetic property, a first magnetic path and a second magnetic path, and a permanent magnet. The device also includes a driving portion to excite the electromagnet in the forward direction and then increases an attraction force on a side on which a magnetic flux is increased or decreased.

5 Claims, 11 Drawing Sheets

(51) Int. Cl.
*F16D 27/112* (2006.01)
*H01F 7/04* (2006.01)
(52) U.S. Cl.
CPC ....... *H01F 7/204* (2013.01); *H01F 2007/208* (2013.01)

(56) References Cited

U.S. PATENT DOCUMENTS

| | | | |
|---|---|---|---|
| 2011/0127133 | A1 | 6/2011 | Ogawa et al. |
| 2012/0197475 | A1* | 8/2012 | Akutsu .................. B60K 6/26 701/22 |
| 2012/0200184 | A1* | 8/2012 | Takeuchi ............... H02K 16/00 310/112 |

FOREIGN PATENT DOCUMENTS

| | | |
|---|---|---|
| JP | 2008-32036 A | 2/2008 |
| JP | 2010-19321 A | 1/2010 |
| JP | 4992384 B2 | 8/2012 |

OTHER PUBLICATIONS

Office Action dated Jul. 10, 2018, issued in Japanese Patent No. JP2015-004265, with translation.

\* cited by examiner

POWER TRANSMISSION DEVICE

TECHNICAL FIELD

The present invention relates to a so called one-shot type power transmission device to switch a coupled state and an uncoupled state between members by utilizing a magnetic force which is generated by a permanent magnet and an electromagnet.

BACKGROUND ART

Conventionally, as a power transmission device of such type, there is known the one disclosed in Patent Literature 1 for example. The one disclosed therein is directed to a power transmission device to switch a coupled state and an uncoupled state between members which are arranged to be attachable or detachable in a transmission path of a driving force to thereby control transmission of the driving force, and is provided with: a movable plate having ferromagnetic property and provided to be movable forwardly or backwardly between the members, the movable plate advancing to thereby set the coupled state between the members, or alternatively, retracting to thereby set the uncoupled state between the members; permanent magnets which are respectively arranged at an advancing side and a retracting side of the movable plate, each of which generates a magnetic force of attracting the movable plate to thereby hold advancement and retraction of the movable plate; an electromagnet to generate an attraction force of moving the movable plate to be advanced or retracted; a power source mechanism to supply a current to the electromagnet to thereby generate an electromagnetic force so as to move the movable plate to be advanced or retracted by the attraction force which is greater than a holding force with respect to the movable plate exerted by the permanent magnet; and a power control mechanism to control a current to be supplied from the power source mechanism to the electromagnet when the movable plate is moved to be advanced or retracted.

According to such a configuration, a coupled state and an uncoupled state between members are established by holding advancement and retraction of a movable plate by employing a magnetic force of a permanent magnet, and transmission and transmission stop of the driving force can be thereby maintained by only the magnetic force of the permanent magnet. In this manner, power for maintaining the coupled state between the members (transmission of the driving force) and the uncoupled state therebetween (transmission stop of the driving force) is eliminated. On the other hand, a case in which a current is supplied to an electromagnet which takes power consumption is only a case of switching the coupled state between the members (transmission of the driving force) and the recoupled state therebetween (transmission stop of the driving force), and a power source mechanism is controlled so that a power control mechanism supplies a current only in this case. As a result, time to consume power is short, thus making it possible to reduce power consumption of a power transmission device.

CITATION LIST

Patent Literature

Patent Literature 1: Japanese Patent No. 4992384

SUMMARY OF THE INVENTION

Problems to be Solved by the Invention

However, in the conventional configuration described above, two electromagnets are required to generate a magnetic flux on the advancing side of a movable plate and to generate a magnetic flux on the retracting side of the movable plate, and must be respectively arranged in their different positions. An electromagnet requires a certain degree of size in iron core or coil with respect to the required power; and therefore, in such a configuration, it is difficult to cope with a case in which downsizing or cost reduction of the entire device are required, and the two electromagnets are driven; and therefore, the driving device is also complicated accordingly.

In addition, a permanent magnet is provided on a respective one of the advancing side and the retracting side of the movable plate, and the compactness is further hindered, causing higher costs.

The present invention focuses on the problem described above, and it is an object of the present invention to provide a power transmission device in which an electromagnet and a permanent magnet each are merely provided in one location, and the power transmission state can be appropriately switched in a so called one-shot manner.

Means for Solving the Problem

In order to achieve the object described above, the present invention takes the following means.

That is, a power transmission device of the present invention is directed to a power transmission device to switch a coupled state and an uncoupled state between a first member and a second member which are arranged in a transmission path of a driving force to thereby control transmission of the driving force, and is provided with: a movable body having ferromagnetic property and arranged retractably and integrally rotatably at the second member, the movable body advancing to thereby set the coupled state between the first member and the second member, or alternatively, retracting to thereby set the uncoupled state between the first member and the second member; a first magnetic path and a second magnetic path including the movable body, each of which is formed on an advancing side or a retracting side of the movable body; a permanent magnet arranged in one location in a position through which both of the first magnetic path and the second magnetic path pass, the permanent magnet attracting and holding the movable body at a first member side by a magnetic flux which is generated along the first magnetic path when the movable body is set on the first member side, or alternatively, attracting and holding the movable body at an opposite side to the first member side by a magnetic flux which is generated along the second magnetic path when the movable body is set on the opposite side to the first member side; an electromagnet arranged in one location in a position in which the permanent magnet is excited in a forward direction or a reverse direction with respect to a magnetic flux which is generated at either the first magnetic path or the second magnetic path to thereby increase or decrease the electromagnet; and a driving portion to excite the electromagnet in the forward direction to increase an attraction force on a side on which a magnetic flux is increased or decreased to thereby draw the movable body that has been attracted and held on an opposite side to the side on which the magnetic flux is increased or decreased, or alternatively, excites the electromagnet in the reverse direction to reduce a holding force of the movable body which is attracted and held on the side on which the magnetic flux is increased or decreased to thereby space the movable body by the attraction force exerted by the magnetic flux on the opposite side to the side on which the magnetic flux is increased or decreased. The driving portion that is herein referred to as means an electromagnet driving portion.

In this manner, when a driving portion does not excite an electromagnet, a movable body can be attracted and held to be stable on the advancing side or the retracting side by means of a permanent magnet. On the other hand, if the driving portion excites the electromagnet in the forward direction, the movable body that has been attracted and held in a spaced position is attracted and then an adsorption position is reversed, and further, if the driving portion drives the electromagnet in the reverse direction, the movable body that has been adsorbed and held is released and then the adsorption position of the movable body is reversed again.

Thus, according to the present invention, the permanent magnet and the electromagnet each are merely provided in one location, and a one-shot clutch/brake to excite the electromagnet only at the time of switching the power transmission state can be thereby appropriately configured, and the constituent elements are reduced, and further, the compactness and cost reduction can be achieved.

In this case, in order to more reliably carry out operation of a movable body, it is desirable that a configuration be made in such a manner so as to simultaneously reduce a holding force with respect to the movable body that has been attracted and held, by the magnetic flux on the opposite side to the side on which the magnetic flux is increased or decreased, when the electromagnet is excited in the forward direction, and so as to simultaneously increase the attraction force exerted by the magnetic flux on the opposite side to the side on which the magnetic flux is increased or decreased, when the electromagnet is excited in the reverse direction.

In order to more significantly enhance the compactness of the structure and the effectiveness of increasing or decreasing the magnetic flux, it is preferable to generate the magnetic flux exerted by the electromagnet, along the magnetic path on the side on which the magnetic flux is increased or decreased.

In this case, in order to more effectively enhance a movement force when the movable body is moved to the opposite side to the side on which the magnetic flux is increased or decreased, in particular, it is effective to reduce the magnetic path length of the magnetic path on the opposite side to the side on which the magnetic flux is increased or decreased by the electromagnet, with respect to the magnetic path at the side on which the magnetic flux is increased or decreased by the electromagnet.

By virtue of the similar reason, it is effective that a mechanical spring is provided in a position in which spacing of the movable body is accelerated when the electromagnet weakens the magnetic flux.

Effect of the Invention

According to the present invention described hereinabove, a permanent magnet and an electromagnet each are merely provided in one location, a so called one-shot clutch/brake to excite the electromagnet only at the time of switching the drive transmission state can be thereby appropriately configured, and the constituent elements are reduced in number, thus making it possible to achieve the compactness and cost reduction.

MODE FOR CARRYING OUT THE INVENTION

An embodiment of the present invention will be described with reference to FIG. 1 to FIG. 5.

Figure 1:
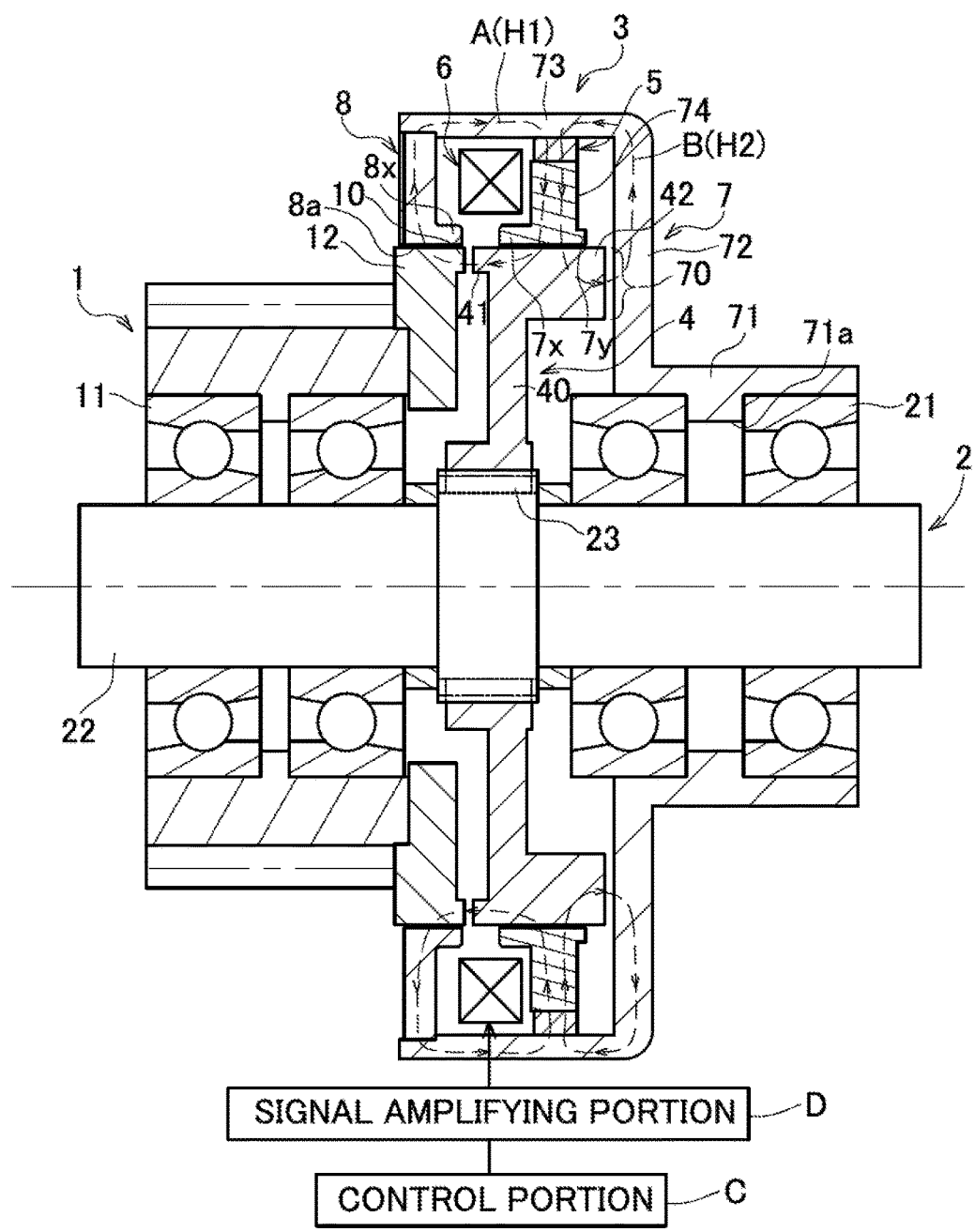
FIG. 1 is a schematic view of a structure showing an embodiment of the present invention.

A power transmission device shown in FIG. 1 mounts to a casing 3: a first input and output shaft 1 which is a first member along a transmission path of a driving force; and a second input and output shaft 2 which is a second member, and switches a coupled state and an uncoupled state between these shafts 1 and 2 to thereby control transmission of the driving force. Thus, this device is equipped with: an armature 4 which is a movable body in the casing 3; a permanent magnet 5; and an electromagnet 6, and can be utilized as a clutch device or a brake device or a clutch/brake device. Hereinafter, a description will be furnished, assuming that the first input and output shaft 1 is defined as an output shaft and the second input and output shaft 2 is defined as an input shaft, and in the figure, the leftward direction is a front side, and the rightward direction is a rear side.

The casing 3, in an external view, has a columnar shape (a frame shape), and is equipped with: a cup-shaped yoke 7 which is a frame constituent member arranged at an input side of a torque which is a rotation driving force; and a first magnetic pole 8 which is a constituent member arranged at an output side of the torque. The yoke 7 has: a boss portion 71 having a through hole 71a at a central portion thereof; an annular jaw portion 72 which opens to a front end side of the boss portion 71; and a cylindrical outer circumferential portion 73 communicating with an outer circumferential side of the jaw portion 72, and a bearing 21 is arranged at an inner circumference of the boss portion 71 to rotatably support an input shaft 2. The input shaft 2 of the embodiment is a solid shaft, and an extension portion 22 extends up to a position having penetrating a yoke 3. In addition, the first magnetic pole 8 is an annular pole provided in a position which is opposite to that of the jaw portion 72 of the yoke 7.

On the other hand, the output shaft 1 of the embodiment is a hollow shaft, and is rotatably pivoted via a bearing 11 to the extension portion 22 of the input shaft 2. That is, the input shaft 2 and the output shaft 1 are respectively established in a relationship in which these shafts are pivoted each other via the bearing 11. At a shaft end portion of the output shaft 1, a rotary portion 12 made of a magnetic material is integrally mounted; the rotary portion 12 is inserted into an internal space of the yoke 7; and an outer circumference thereof is opposed with a minute gap to an inner circumference 8a of the first magnetic pole 8.

In addition, at an outer circumferential portion 73 of the yoke 7, a second magnetic pole 74 formed in an annular shape is arranged to be integral with the permanent magnet 5. The second magnetic pole 74 opposes to the jaw portion 72 of the yoke 7 and opposes to the first magnetic pole 8; is arranged in a position which is displaced to the jaw portion 72 side of the yoke 7 more significantly than the first magnetic pole 8; and is fixed, together with the permanent magnet 5, to an interior face of the outer circumferential portion 73 of the yoke 7.

On the other hand, the armature 4 is formed of a material having ferromagnetic property. That is, the armature 4 is formed of a ferromagnetic material such as iron, nickel, or cobalt and an alloy obtained by combining these substances with each other or a ferromagnetic material such as an alloy including one or more of these substances.

In the armature 4, at an outer circumferential side of a disk portion 40, a first adsorbed portion 41 and a second adsorbed portion 42, each of which is formed in a protrusive shape which protrudes towards an output shaft 1, an opposite side of the output shaft 1 are provided along a circumference thereof, and the circumference thereof is engaged with a hub 23 which is provided to be integral with the input shaft 2 so as to be integrally rotatable and to be movable in an axial direction. Such a configuration can be easily achieved by engaging the hub 23 and the armature 4 with each other by means of a key and a key groove, for example, or alternatively, spline-engaging them, etc. The outer circumference of the armature 4 is opposed, with a minute gap, to the inner circumference of the second magnetic pole 74.

In addition, in a position which is opposite to that of the first adsorbed portion 41 of the armature 4 of the rotary portion 12 and in a position which is opposite to that of the second adsorbed portion 42 of the armature 4 of the disk portion 72 of the yoke 7, the first adsorbing portion 10 and the second adsorbing portion 70 are respectively set, and the armature 4 is movable to advance or retract between a position in which the first adsorbed portion 41 is adsorbed by the first adsorbing portion 10 and in a position in which the second adsorbed portion 42 is adsorbed by the second adsorbing portion 70. In the embodiment, only the first adsorbing portion 10 forms a protrusive shape which protrudes from the periphery towards the armature 4; and however, the second adsorbing portion 70 side may also be configured in a protrusive shape which protrudes from the periphery towards the armature.

In this manner, on the advancing side and the retracting side of the armature 4, a first magnetic path A and a second magnetic path B are respectively formed. More specifically, the first magnetic path A is formed in a position which surrounds the armature 40, the rotary portion 12, the first magnetic pole 8, the yoke outer circumferential portion 73, and the second magnetic pole 74, and the second magnetic path B is formed in a position which surrounds the armature 4, the yoke jaw portion 72, the yoke outer circumferential portion 73, and the second magnetic pole 74. The first magnetic path A may be configured so as to not pass the rotary portion 12 (the output shaft 1), or alternatively, the second magnetic path may be configured so as to pass the input shaft 2.

In addition, one permanent magnet 5 is arranged in one location in a position through which both of the first magnetic path A and the second magnetic path B pass, in the embodiment at the outer circumferential portion of the second magnetic pole 74. The permanent magnet 5 of the embodiment is magnetized with respect to pole S at the outer circumferential side and is magnetized with respect to pole N at the inner circumferential portion, and is configured to generate a magnetic force in the direction from the outer circumferential side to the inner circumferential side. Of course, this magnet may be configured to generate a magnetic force in the reverse direction. The permanent magnet 5 generates a magnetic flux H1 along the first magnetic path A to thereby draw the armature 4 towards the output shaft 1 (the advancing side), and generates a magnetic flux H2 along the second magnetic path B to thereby draw the armature 4 to the opposite side of the output shaft 1 (the retracting side). Incidentally, the wordings "a permanent magnet in one location" and "one permanent magnet" each include a mode in which elements of the permanent magnet are functionally integrated with each other in one location and in a singular form.

Figure 3:
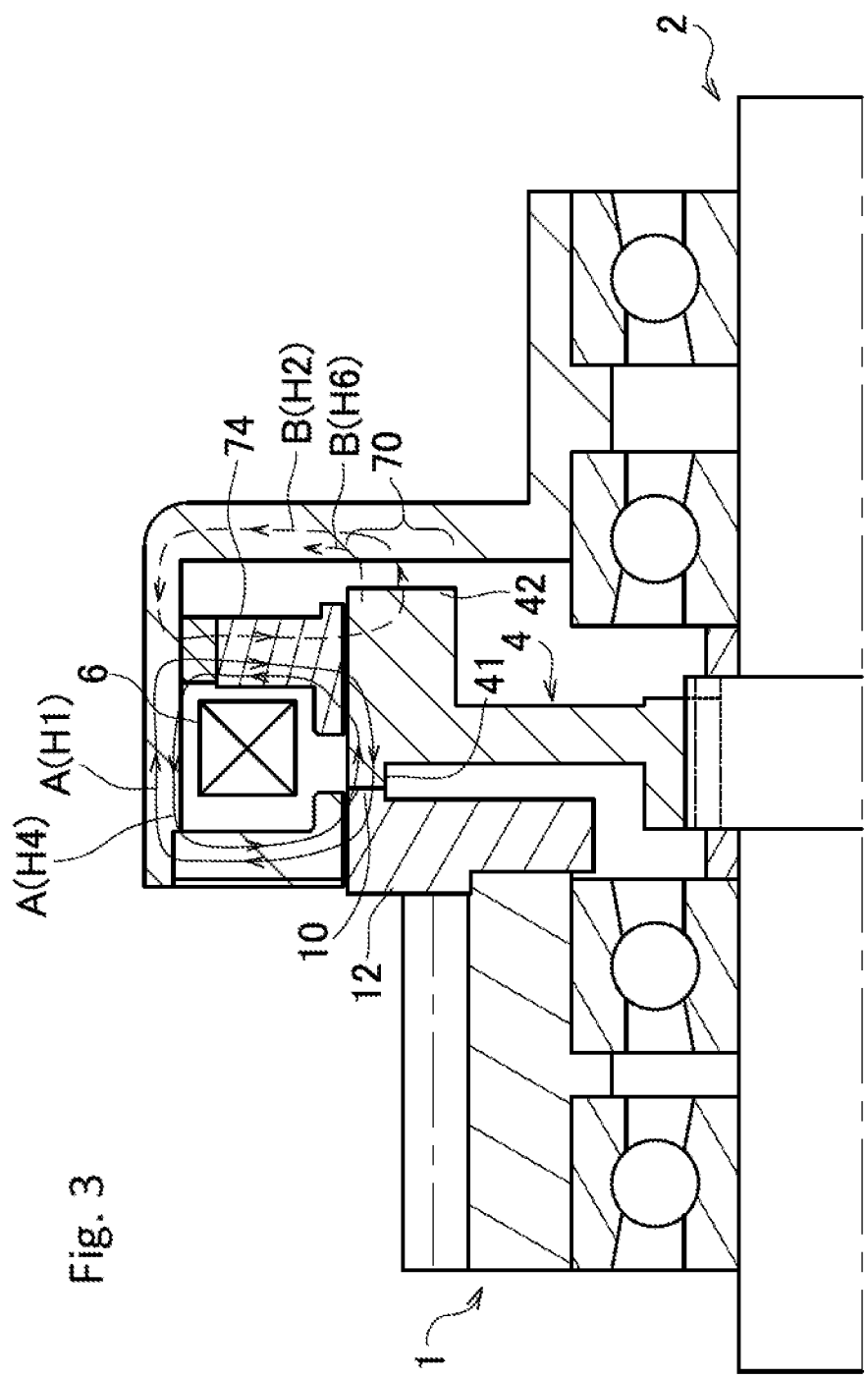
FIG. 3 is an illustrative view of functions of the embodiment.
Figure 5:
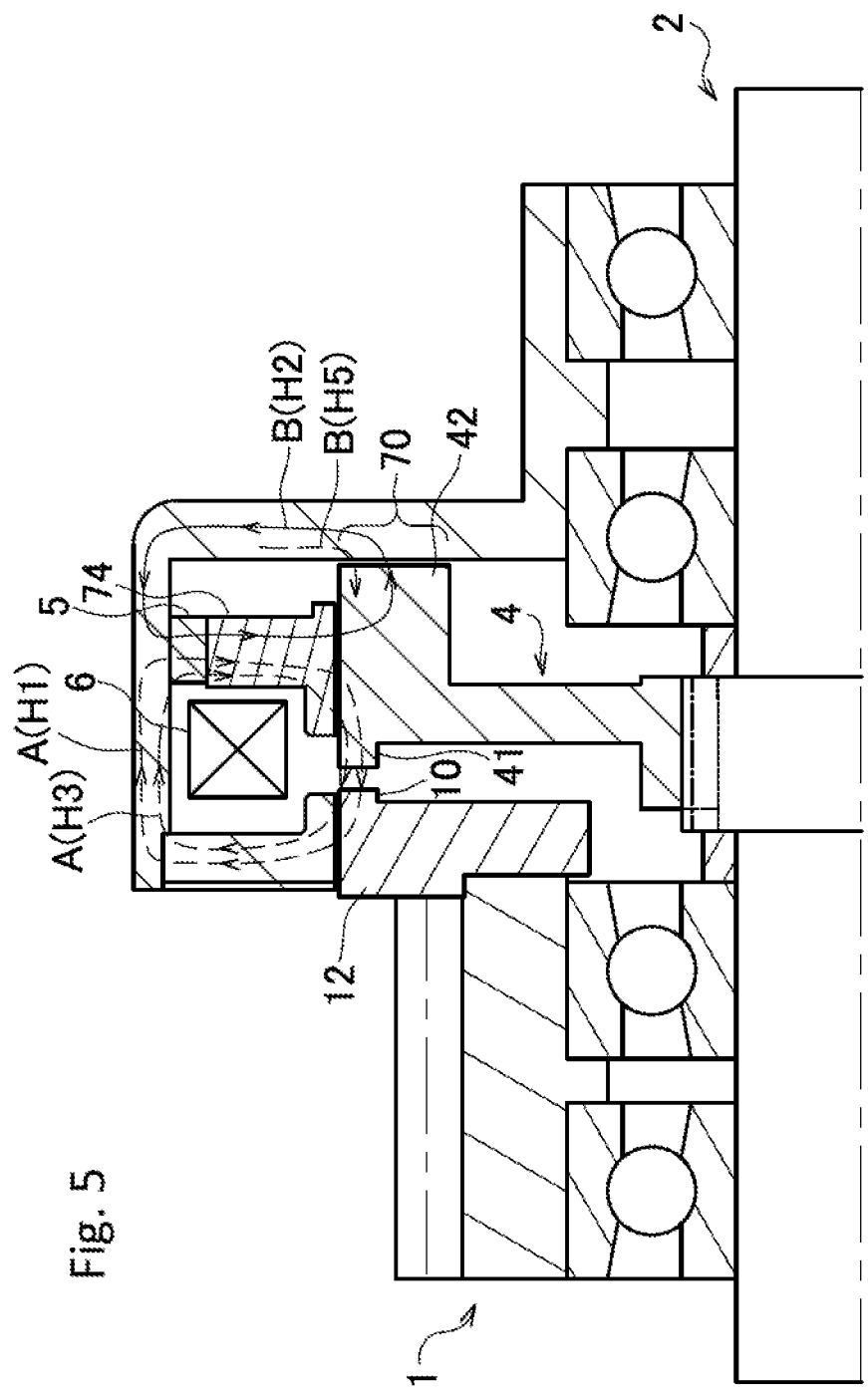
FIG. 5 is an illustrative view of functions of the embodiment.

In addition, one electromagnet 6 which is configured by winding an electromagnetic coil around an iron core is arranged in one location of either the advancing side or the retracting side of the armature 4, in the embodiment in a position which is the advancing side of the armature, and which is surrounded by the first magnetic path A. In the electromagnet 6, a voltage is applied in one direction (excited in the forward direction) to thereby generate a magnetic flux H3 is applied in the same direction as that of the magnetic flux H1 exerted by the permanent magnet, along the first magnetic path as shown in FIG. 5, and a voltage is applied in another direction (excited in the reverse direction) to thereby generate a magnetic flux H4 in the reverse direction from that of the magnetic flux H1 exerted by the permanent magnet 5, along the first magnetic path A as shown in FIG. 3. The first magnetic path A and the second magnetic path B overlap each other in the second magnetic pole 74 and then are magnetically connected to each other, and the second magnetic path B is also influenced by the electromagnet 6. That is, in the state of FIG. 5 in which the electromagnet 6 has been excited in the forward direction, a magnetic flux H5 in the reverse direction from that of the magnetic flux H2 exerted by the permanent magnet 5 is generated at a part of the second magnetic path B, and in the state of FIG. 3 in which the electromagnet has been excited in the reverse direction, a magnetic flux H6 in the same direction as that of the magnetic flux H2 exerted by the permanent magnet 5 is generated at a part of the second magnetic path B.

In addition, a signal amplifying portion D which is a driving portion is connected to the electromagnet 6. In the signal amplifying portion D, when the armature 4 is set in the retracting position, an excitation instruction in the forward direction is input to thereby excite the electromagnet 6 in the forward direction, and when the armature 4 is set in the retracting position, an excitation instruction in the reverse direction is input to thereby excite the electromagnet 6 in the forward direction. When there is no input, there is no excitation. An input of such excitation instruction is switched by a control portion C. That is, the signal amplifying portion D that is the driving portion is configured to amplify a signal input from the control portion C and then apply a voltage to the electromagnet 6.

In the above description, in comparison with the first magnetic path A side on which the electromagnet 6 is provided, the constituent elements are fewer, the structure is more compact, and the magnetic path length of the magnetic path B is reduced more remarkably on the second magnetic path B side on which the electromagnet 6 is provided.

Incidentally, those which are designated by reference numerals 7x, 7y, 8x are widened portions which are provided at the magnetic poles 8, 74, and the magnetic path width is increased by these widened portions 7x, 7y, 8x so that no magnetic flux passes. In the appropriate locations of the widened portions 7x, 7y, 8x, edges are respectively R-shaped to thereby prevent the coming and outgoing magnetic flux from leaking out from the edges.

A gap between the adsorbed portion 42 and the second adsorbing portion 70 can also be utilized for a brake mechanism.

Next, an actuation will be described. First, when the armature 4 is set in the retracting position shown in FIG. 4 and is not excited, an air gap between the first adsorbed portion 41 of the armature 4 and the adsorbing portion 10 of the rotary portion 12 is more significantly increased in comparison with a state in which an air gap between the second adsorbed portion 42 of the armature 4 and the second adsorbing portion 70 of the yoke 7 is zero or extremely small; and therefore, an adsorption force of adsorbing the second adsorbed portion 42 of the armature 4 by the second adsorbing portion 70 of the yoke 7 is more significantly increased by the magnetic flux H2 that the permanent magnet 5 forms in the second magnetic path B, in comparison with a force of attracting the armature 4 towards the output shaft 1 by the magnetic flux H1 that the permanent magnet 5 forms in the first magnetic path A1, and the armature 4 is established in a released state between the input shaft 2 and the output shaft 1 while being kept to be adsorbed and held in the retracting position.

Figure 2:
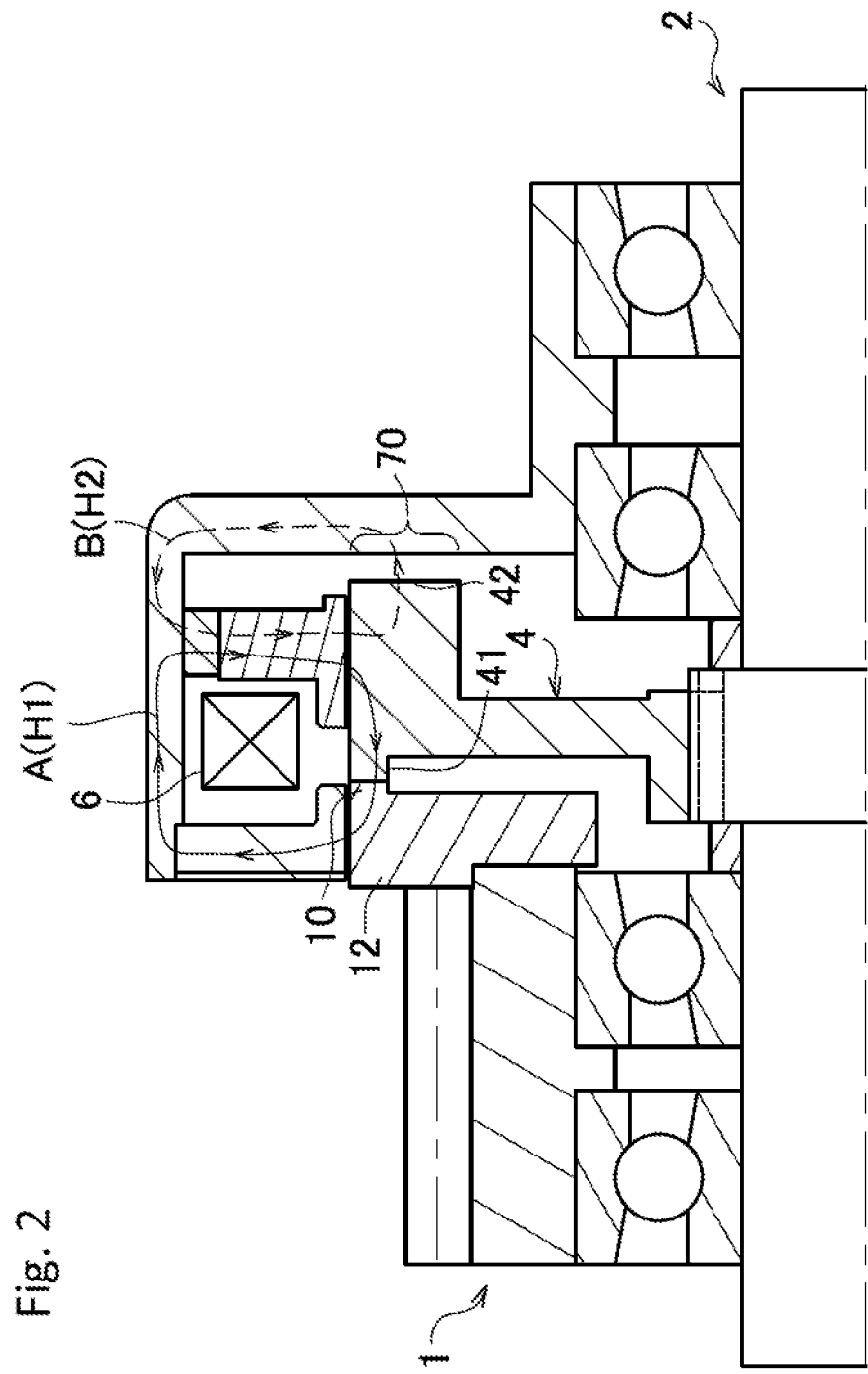
FIG. 2 is an illustrative view of functions of the embodiment.

When the excitation instruction in the forward direction is input by the control portion C from this state and then the electromagnet 6 is excited by the signal amplifying portion D, as shown in FIG. 5, the magnetic flux H3 in the same direction as that of the magnetic flux H1 that is formed in the first magnetic path A by the permanent magnet 5 is formed in the first magnetic path A, and the magnetic flux is increased to thereby enhance the attraction force with respect to the armature 4. The magnetic flux of the electromagnet 6 at that time is simultaneously routed to the second magnetic path B to thereby generate the magnetic flux H5 in the reverse direction from that of the magnetic flux H2 that the permanent magnet 5 forms in the second magnetic path B and then weaken the adsorption force of adsorbing the armature 4 by the second adsorbing portion 70. As a result, the armature 4 is released from the second adsorbing portion 70 and advances and then inverts the adsorption destination to the first adsorbing portion 10 as shown in FIG. 2. As a result, the input shaft 2 and the output shaft 1 are coupled to each other.

Even if there is no excitation instruction from the control portion C and there is no excitation from the signal amplifying portion D, an air gap between the second adsorbed portion 42 of the armature 4 and the adsorbing portion 70 of the yoke 7 is more significantly increased in comparison with a state in which an air gap between the first adsorbed portion 41 of the armature 4 and the adsorbing portion 10 of the rotary portion 12 is zero or extremely small; and therefore, an adsorption force by which the first adsorbed portion 41 of the armature 4 is adsorbed by the first adsorbing portion 10 of the rotary portion 12 by the magnetic flux H1 that the permanent magnet 5 forms in the first magnetic path A is more significantly increased in comparison with a force of attracting the armature 4 to the opposite side of the output shaft 1 (the retracting side) by the magnetic flux H2 that the permanent magnet 5 forms in the second magnetic path B, and the armature 4 is established in a released state between the input shaft 2 and the output shaft 1 while being kept to be adsorbed and held in the advancing position.

Figure 4:
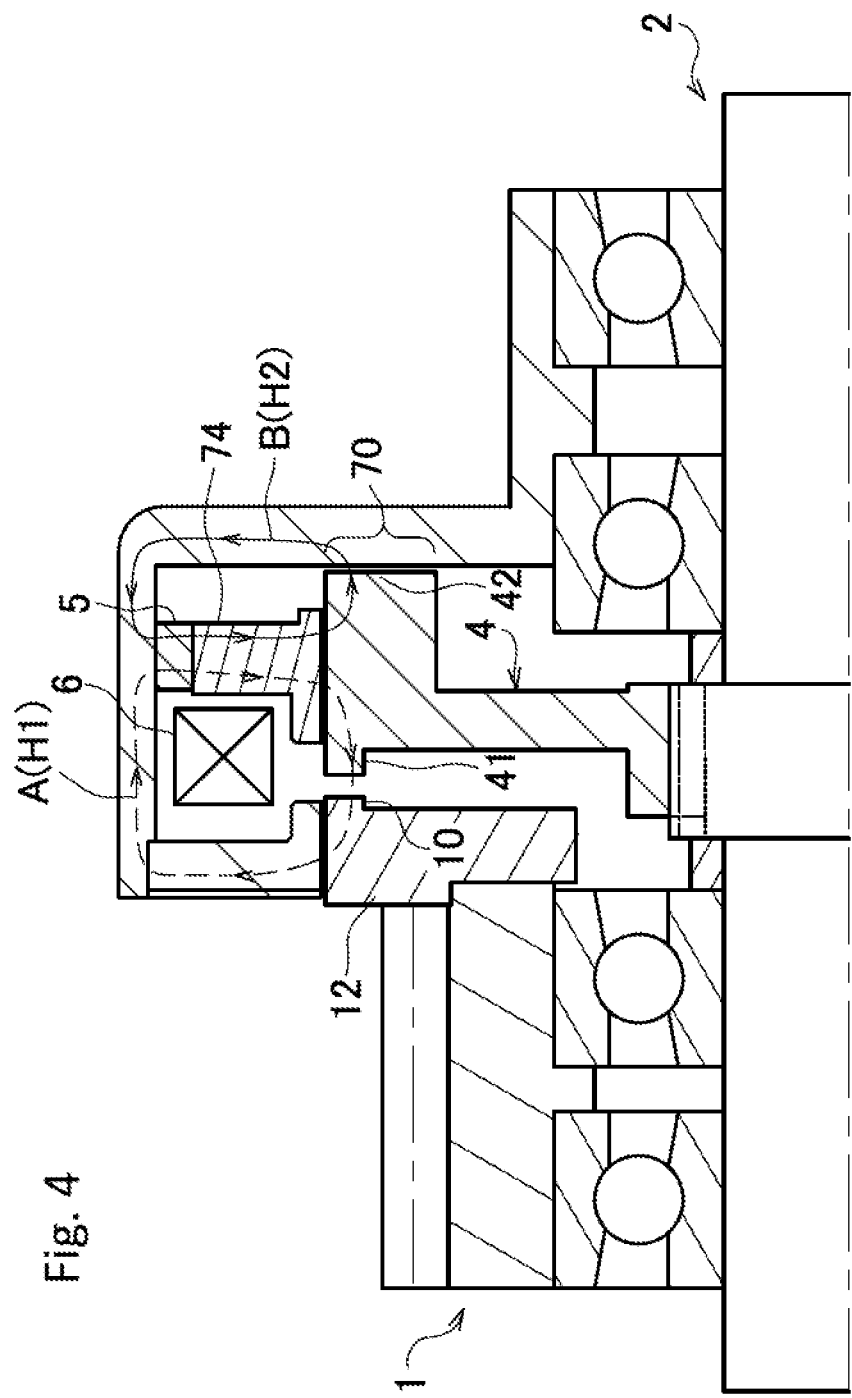
FIG. 4 is an illustrative view of functions of the embodiment.

Further, if the excitation instruction is input from the control portion C in this state and then the electromagnet 6 is excited by the signal amplifying portion D, as shown in FIG. 3, the magnetic flux H4 in the reverse direction from that of the magnetic flux H1 that is formed in the first magnetic path A by the permanent magnet 5 is formed in the first magnetic path A, and the magnetic flux is decreased to thereby weaken the attraction force with respect to the armature 4. The magnetic flux of the electromagnet 6 at this time is simultaneously routed to the second magnetic path B, and the permanent magnet 5 generates the magnetic flux H6 in the same direction as that of the magnetic flux H2 that is formed in the second magnetic path B and then strengthens the attraction force of attracting the armature 4 to the second adsorbing portion 70 side. As a result, the armature 4 is released from the first adsorbing portion 10 and retracts and then inverts the adsorption destination to the second adsorbing portion 70 as shown in FIG. 4. As a result, the input shaft 2 and the output shaft 1 are uncoupled from each other again.

As described above, the power transmission device of the embodiment is provided with: a armature 4 which is a movable body having ferromagnetic property to switch a coupled state and an uncoupled state between an output shaft 1 which is a first member arranged in a transmission path of a driving force and an input shaft 2 which is a second member to control transmission of the driving force, the movable body being arranged to be retractable and integrally rotatable with the input shaft 2 and advancing to thereby couple the input shaft 2 and the output shaft 1 to each other, or alternatively, retracting to thereby uncouple the input shaft 2 and the output shaft 1 from each other; a first magnetic path A and a second magnetic path B including the armature 4, each of which is formed on a advancing side or a retracting side thereof, a permanent magnet 5 arranged in one location in a position through which both of the first magnetic path A and the second magnetic path B pass, the permanent magnet attracting and holding the armature 4 towards an output shaft 1 by a magnetic flux H1 which is generated along the first magnetic path A when the armature 4 is set on the output shaft 1 side, or alternatively, attracting and holding the armature 4 on an opposite side of the output shaft 1 by a magnetic flux H2 which is generated along the second magnetic path B when the armature 4 is set on the opposite side of the output shaft 1; an electromagnet 6 arranged in one location in a position in which the permanent magnet 5 is excited in a forward direction or a reverse direction with respect to the magnetic flux H1 which is generated in the first magnetic path A and is thereby increased or decreased; and a signal amplifying portion D which is a driving portion, in which the electromagnet 6 is excited in the forward direction to thereby increase the attraction force on the first magnetic path A side on which the magnetic flux is increased or decreased and then draw the armature 4 that has been attracted and held on the second magnetic path B side on the opposite side to the side on which the magnetic flux is increased or decreased, or alternatively, the electromagnet 6 is excited in the reverse direction to thereby reduce a holding force of the armature 4 that has been attracted and held on the first magnetic path A side on which the magnetic flux is increased or decreased and then space the armature 4 by the attraction force exerted by the magnetic flux H2 at the second magnetic path B on the opposite side to that on which the magnetic flux is increased or decreased.

In this manner, when the signal amplifying portion D does not excite the electromagnet 6, the armature 4 can be attracted and held to be stable on the advancing side or the retracting side by the permanent magnet 5. On the other hand, if the signal amplifying portion D excites the electromagnet 6 in the forward direction, the armature 4 that has been attracted and held at a spaced position is attracted and then the adsorption position is inverted, and further, if the signal amplifying portion D drives the electromagnet 6 in the reverse direction, the armature 4 that has been absorbed and held is released and then the adsorption position of the armature 4 is inverted again.

Thus, according to the present invention, the permanent magnet 5 and the electromagnet 6 each are provided in one location, and a one-shot clutch/brake to excite the electromagnet 6 only at the time of switching the power transmission state can be thereby appropriately configured, and the constituent elements are reduced and further the compactness and cost reduction can be achieved.

A construction is made in such a manner as to weaken, when the electromagnet 6 is excited in the forward direction, the magnetic flux H2 on the opposite side to that on which the magnetic flux is increased or decreased to thereby simultaneously reduce the holding force with respect to the armature 4 that has been attracted and held, or alternatively, to strengthen, when the electromagnet 6 is excited in the reverse direction, the magnetic flux H2 on the opposite side to that at which the magnetic flux is increased or decreased to thereby simultaneously increase the attraction force; and therefore, a movement force increases when the signal amplifying portion D excites the electromagnet 6 in the forward direction to thereby draw the armature 4 that has been attracted and held at the spaced position, and further, a movement force increases when the signal amplifying portion D excites the electromagnet 6 in the reverse direction and then the armature that has been attracted and held is released and then the armature is spaced, and operation of the armature 4 can be more reliably carried out.

In addition, the magnetic fluxes H3, H4 exerted by the electromagnet 6 are generated along the magnetic path on the side on which the magnetic fluxes are increased or decreased, that is, along the first magnetic path A; and therefore, the magnetic path of the permanent magnet 5 is efficiently utilized, making it possible to effectively enhance the compactness of the structure and the effectiveness of increasing or decreasing the magnetic fluxes.

Further, with respect to the magnetic path of which magnetic flux is increased or decreased by the electromagnet 6, that is, the first magnetic path A, the magnetic path length of the second magnetic path on the opposite side to the side on which the magnetic flux is increased or decreased by the electromagnet 6, that is, the second magnetic path is reduced; and therefore, a leakage magnetic flux or a magnetic loss or the like is restrained, making it possible to efficiently enhance the movement force when the armature 4 is moved to the opposite side to that on which the magnetic flux is increased or decreased.

Furthermore, at the armature 4, the protrusively shaped adsorbed portions 41, 42 that protrude towards the output shaft 1 and the opposite side of the output shaft 1 are provided, and on the output shaft 1 side, the protrusively shaped adsorbing portion 10 that opposes to the adsorbed portion 41 is provided; and therefore, through the height or width or the like of the protrusion, not only the density of the magnetic flux but also the attraction force can be easily set at the desired values.

Hereinabove, although the embodiment of the present invention has been described, the specific configuration of each portion is not limitative to the illustrative example.

For example, although in the above configuration, the electromagnet 6 was arranged on the advancing side of the armature 4 that is a movable body, the electromagnet may be arranged at the retracting side. In addition, although the above configuration was made in such a manner as to set the output shaft 1 as the first member that is arranged in the transmission path of the driving force, and set the input shaft 2 as the second member that is arranged therein to be able to impart a braking force to the input shaft 2, reference numeral 1 may be configured as an input shaft and reference numeral 2 is configured as an output shaft without being limitative to such a configuration. In this case as well, the electromagnet may be arranged at either of the forward and rearward sides with respect to the armature 4 that is a movable body.

In addition, although in the embodiment described above, the first member (the output shaft) and the second member (the input shaft) were established in a relationship in which these members are pivoted each other, the first member (an input/output shaft) and the second member (an input/output shaft) may be configured in a relationship in which they oppose to each other without being limitative to such a configuration.

Further, although in the embodiment, the first magnetic path was configured so as to pass the rotary portion 12 that rotates integrally with the first member (the output shaft), the first magnetic path can also be configured so as not to pass the first member (the output shaft) or the rotary portion that rotates integrally therewith, without being limitative to such a construction.

Furthermore, although in the embodiment described above, a brake was configured to be applied when the movable body has retracted, a clutch can also be configured to stop in abutment against a stopper which is provided at the second member (the input shaft) when the movable body has retracted. Such a configuration is also included in the mode to be adsorbed to the opposite side of the first member.

In addition, although the driving device of the embodiment was described as using a voltage power source, a current power source may be employed and configured. By employing the current power source, a required current can be fed to the electromagnetic coil. However, the voltage power source has an advantage in that employment of the current power source increases costs.

In the case of the voltage power source, the current value depends upon the magnetic path length or the air gap or the like, and in particular, when the armature retracts from the advancing position, it is essential that the magnetic force is ensured and the armature is reliably operated. However, in the case of excitation in either of the forward and reverse direction as well, it is desirable to adjust each constituent element so as to be able to apply the same voltage value merely by changing the polarity.

However, if there may occur an operating region in which operation is unstable, it is considered to take an appropriate countermeasure to differentiate the voltage value as required.

Figure 6A:
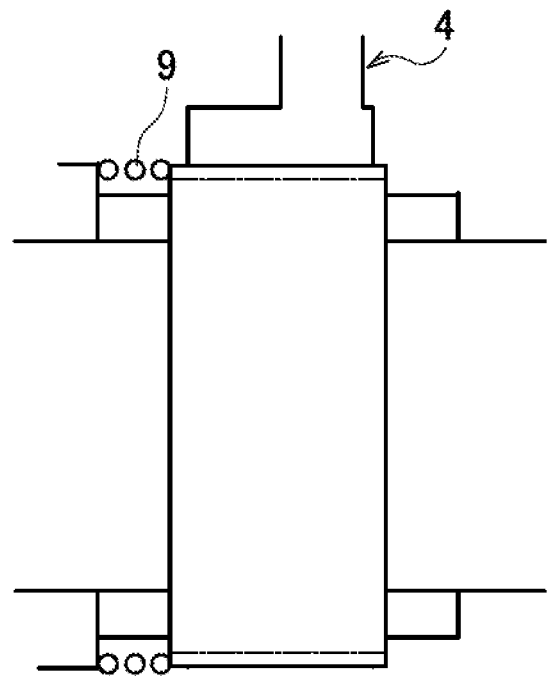
FIG. 6A and FIG. 6B are a view showing a modification example of the embodiment.

Alternatively, as another countermeasure to be taken, as shown in FIG. 6A, it is effective to provide a mechanical spring 9 in a position at which spacing of the movable body is accelerated when the electromagnet 6 has weakened the magnetic flux. In this manner, an unstable region when the aperture 4 that is a movable body starts moving can be reliably activated with the help of biasing of the mechanical spring 9.

Figure 6B:
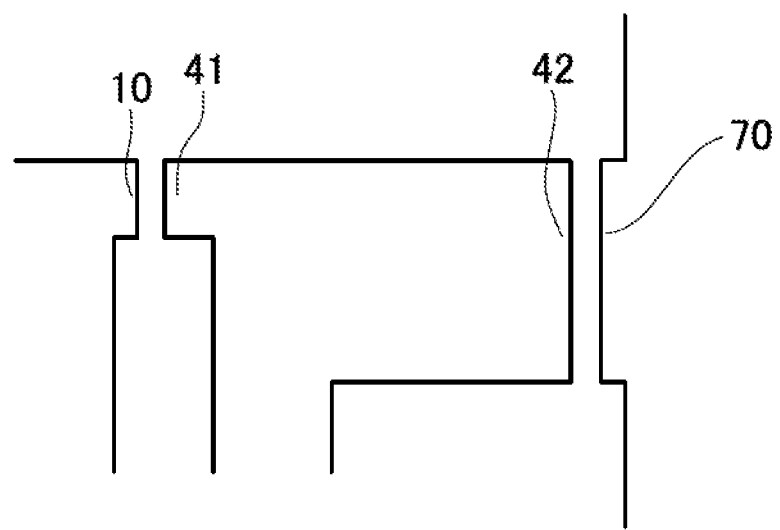

Further, although in the embodiment described above, the protrusively shaped adsorbed portions 41, 42 that respectively protrude towards the first member side and the second member side are provided at the armature 4 that is a movable body, and the protrusively shaped adsorbing portion 10 that opposes to the adsorbed portion 41 was provided at the first member side, as shown in FIG. 6B on the opposite side of the first member as well, the adsorbing portion 70 to adsorb the armature 4 may be formed in a protrusive shape. In this manner, the density of the magnetic flux density is enhanced when the armature 4 retracts, and the armature can be operated more appropriately.

Furthermore, although in the embodiment described above, the permanent magnet 5 was provided on the casing 3 side to house the movable body, more specifically on the outer circumferential side of the second magnetic pole 74 that has been integrated with the yoke 7, the permanent magnet may be provided in the middle of or on the inner circumferential side of the second magnetic pole 74 or may be provided at the outer circumferential portion of the armature 4 side that is a movable body, as long as the permanent magnet is set in one location of the position through which both of the first magnetic path A and the second magnetic path passes.

Figure 7:
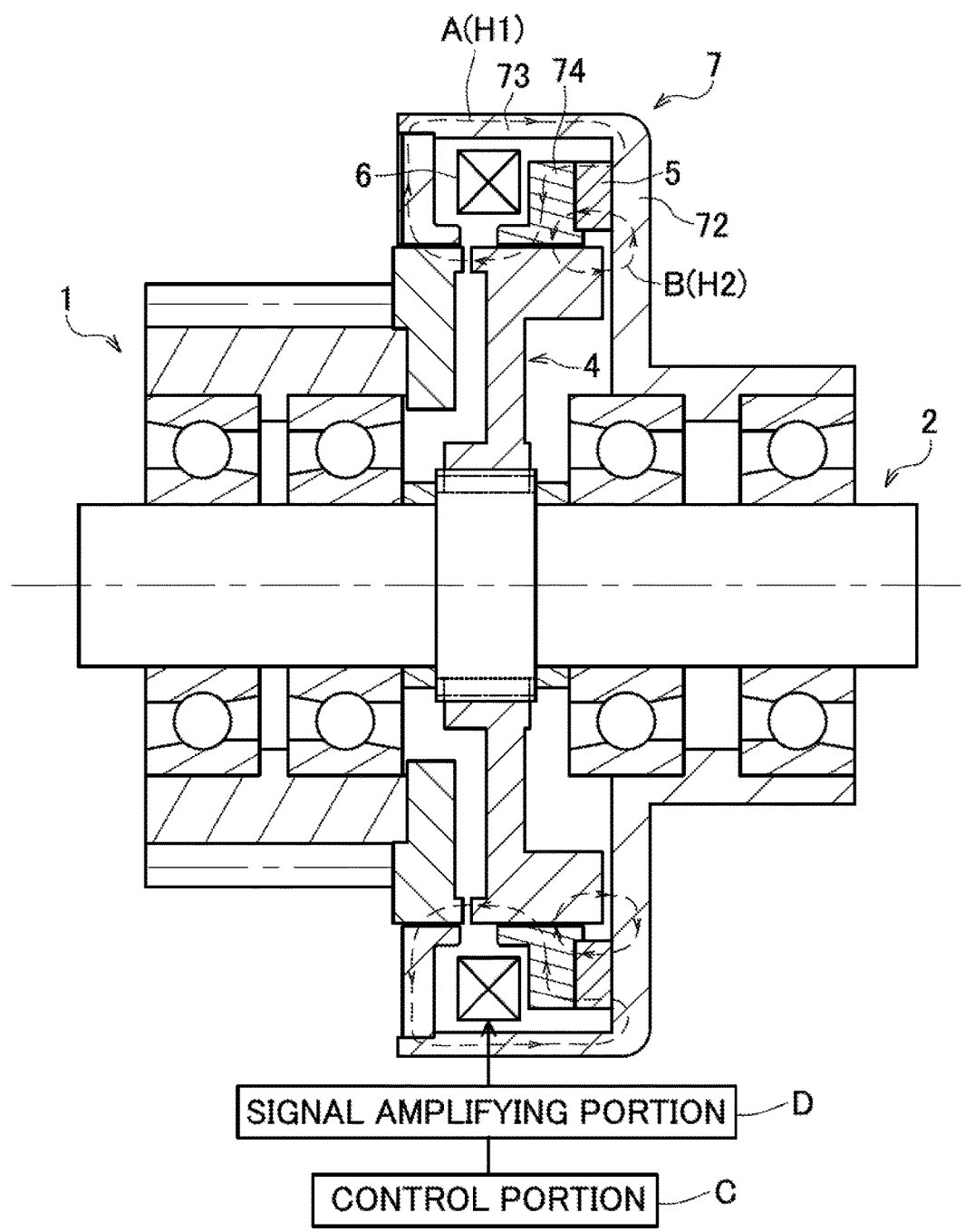
FIG. 7 is a schematic view of a structure showing another embodiment of the present invention.
Figure 8:
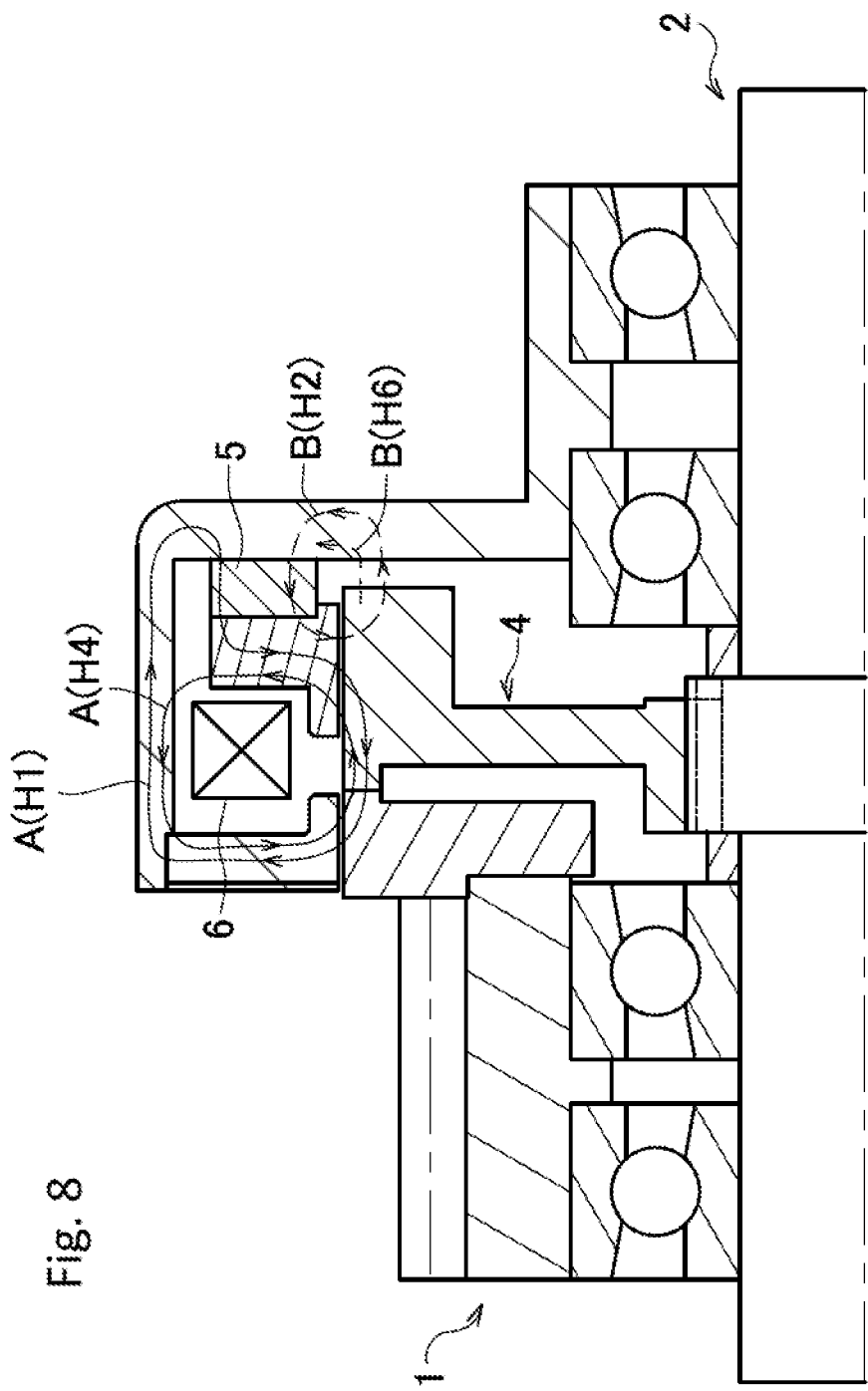
FIG. 8 is an illustrative view of functions of the embodiment.
Figure 9:
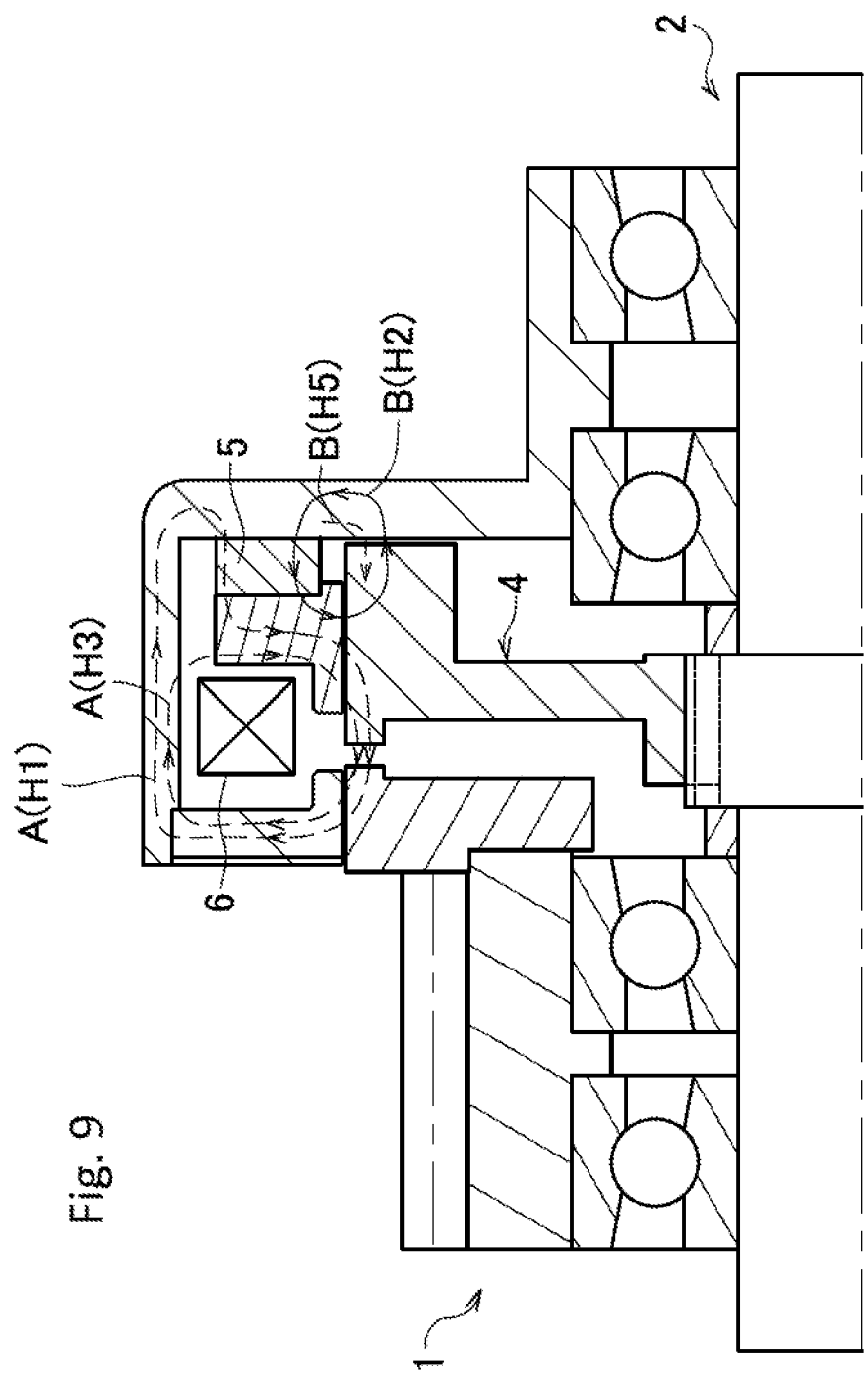
FIG. 9 is an illustrative view of functions of the embodiment.

FIG. 7 to FIG. 9 each show an example in which the permanent magnet 5 mentioned above was provided between a rear end face of the second magnetic pole 74 and the jaw portion 72 of the yoke 7. The permanent magnet 5 is magnetized so that a rear side thereof is pole S and a front side thereof is pole N, and the first magnetic path A formed on a front side of the armature 4 that is a movable body is configured to include a part of the jaw portion 72 of the yoke 7, and on the contrary, the second magnetic path B formed on a rear side of the armature 4 is provided without including the outer circumferential portion 73 of the yoke 7. That is, in comparison with the magnetic path length of the first magnetic path A, the magnetic path length of the second magnetic path B is configured to be shorter. The permanent magnet 5 is composed of a plat magnet.

Specifically, this device is equipped with: an armature 4 which is a movable body, having ferromagnetic property to switch a coupled state and an uncoupled state between an output shaft 1 which is a first member arranged in a transmission path of a driving force and an input shaft 2 which is a second member to thereby control transmission of the driving force, the second member being arranged to be retractable and integrally rotatable with the input shaft 2, advancing to thereby couple the input shaft 2 and the output shaft 1 to each other, or alternatively, retracting to thereby set the uncoupled state between the input shaft 2 and the output shaft 1; a first magnetic path A and a second magnetic path B including the armature 4, each of which is formed on a advancing side or a retracting side thereof, a permanent magnet 5 arranged in one location in a position through which both of the first magnetic path A and the second magnetic path B pass, the permanent magnet attracting and holding the armature 4 on the output shaft 1 side by a magnetic flux H1 which is generated along the first magnetic path A when the armature 4 is set on the output shaft 1 side, or alternatively, attracting and holding the armature 4 on the opposite side of the output shaft 1 by a magnetic flux H2 which is generated along the second magnetic path B when the armature 4 is set on the opposite side of the output shaft 1; an electromagnet 6 arranged in one location of a position at which the permanent magnet 5 is excited in a forward direction or a reverse direction with respect to the magnetic flux H1 that is generated in the first magnetic path A to thereby increase or decrease the permanent magnet; and a signal amplifying portion D which is a driving portion to excite the electromagnet 6 in the forward direction to thereby increase an attraction force on the first magnetic path A side on which the magnetic flux is increased or decreased, by a magnetic flux H3 of the electromagnet 6 shown in FIG. 9, and then draw the armature 4 that has been attracted and held on the second magnetic path B side on the opposite side to that on which the magnetic flux is increased or decreased, or alternatively, to excite the electromagnet 6 in the reverse direction to thereby reduce a holding force of the armature 4 attracted and held on the first magnetic path A side on which the magnetic flux is increased or decreased, by a magnetic flux H4 of the electromagnet 6 shown in FIG. 8, and then, space the armature 4 by an attraction force exerted by the magnetic flux H2 on the second magnetic path B side that is the opposite side to that on which the magnetic flux is increased or decreased, and is configured to switch the signal amplifying portion D by the control portion C.

When the signal amplifying portion D still does not excite the electromagnet 6, the armature 4 can be attracted and held to be stable on the advancing side or the retracing side by means of the permanent magnet 5. On the other hand, if the signal amplifying portion D excites the electromagnet 6 in the forward direction, the armature 4 that has been attracted and held at a spaced position is attracted and then the adsorption position is inverted, and further, if the signal amplifying portion D drives the electromagnet 6 in the reverse direction, the armature 4 that has been attracted and held is released and then the adsorption position of the armature 4 is inverted again.

Thus, according to the illustrative configuration as well, the permanent magnet 5 and the electromagnet 6 each are merely provided in one location, the one-shot clutch/brake to excite the electromagnet only at the time of switching the power transmission state can be thereby configured, the constituent elements are reduced, and the compactness and cost reduction can be achieved.

In addition, this configuration is also made in such a manner that, when the electromagnet 6 has been excited in the forward direction, the magnetic flux H2 on the opposite side to the side on which the magnetic flux is increased or decreased is weakened by the magnetic flux H5 of the electromagnet 6 shown in FIG. 9 to thereby simultaneously reduce the holding force with respect to the armature 4 that has been attracted and held; and when the electromagnet 6 has been excited in the reverse direction, the magnetic flux H2 on the opposite side to that on which the magnetic flux is increased or decreased is strengthened by the magnetic flux H6 of the electromagnet 6 shown in FIG. 8 to thereby simultaneously increase the attraction force; and therefore, a movement force increases when the signal amplifying portion D excites the electromagnet 6 in the forward direction to thereby draw the armature 4 that has been attracted and held at the spaced position, and further, a movement force increases when the signal amplifying portion D excites the electromagnet 6 in the reverse direction, whereby the armature that has been attracted and held is released and then the armature is spaced, and actuation of the armature can be more reliably carried out.

In addition, this is also true for the fact that the magnetic fluxes H3, H4 exerted by the electromagnet 6 is generated along the magnetic path on the side on which the magnetic flux is increased or decreased, that is, along the first magnetic path A, and the magnetic path of the permanent magnet 5 is efficiently utilized and further the compactness of the structure and the efficiency of increasing or decreasing the magnetic flux can be effectively enhanced.

Further, with respect to the magnetic path on the side on which the magnetic flux is increased or decreased by the electromagnet 6, the magnetic path on the opposite side to that on which the magnetic flux is increased or decreased by the electromagnet 6, that is, the magnetic path length of the second magnetic path B is further reduced; and therefore, a leakage magnetic flux or a magnetic loss or the like is restrained more significantly, making it possible to more efficiently enhance a movement force when the armature 4 is moved to the opposite side to the side on which the magnetic flux is increased or decreased.

Advantageous effects attained by the protrusive shape of the adsorbing portion or the adsorbed portion also apply mutatis mutandis to the above description.

Figure 10:
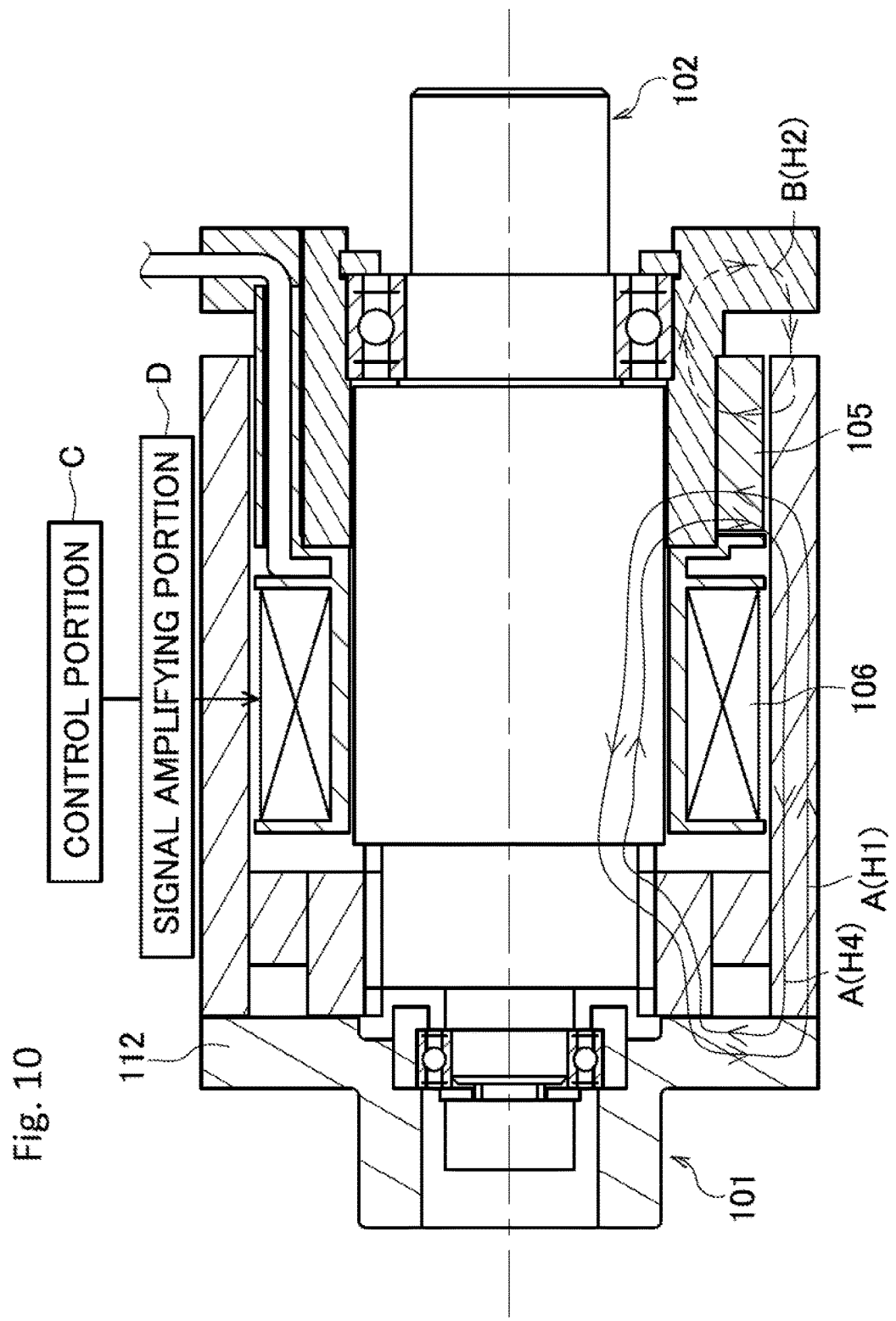
FIG. 10 is a schematic view of a structure which is shown with functions of a further embodiment of the present invention.
Figure 11:
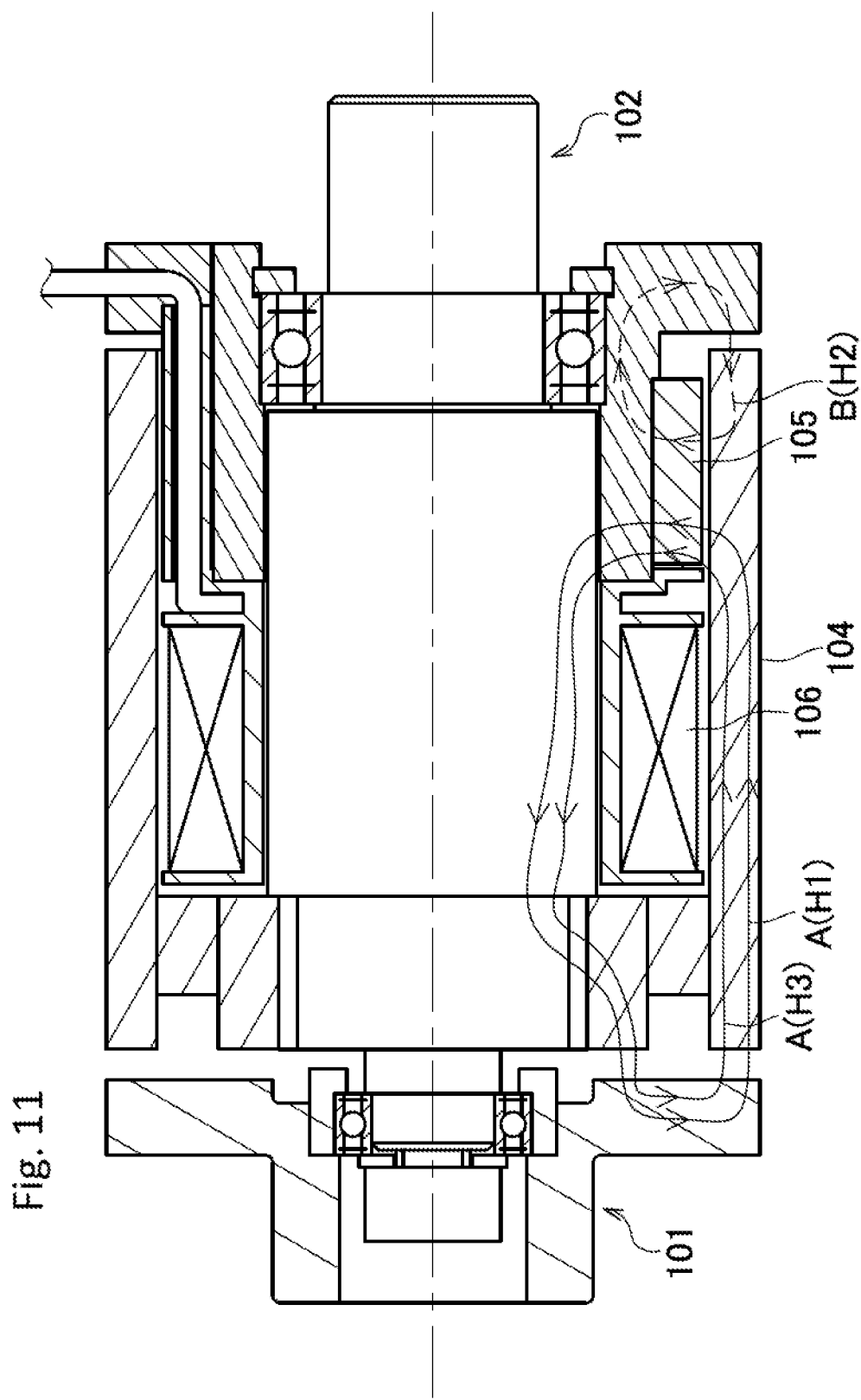
FIG. 11 is a schematic view of a structure which is shown with functions of a furthermore embodiment of the present invention.

Furthermore, as a structural example other than the above description, what is shown in FIG. 10 and FIG. 11 is that an end face of a second member 102 is opposed to a disk-shaped rotary portion 112 of a first member 101 to thereby form a transmission path of a driving force, and the second member is moved longitudinally to the first member 101 to thereby switch a coupled state and an uncoupled state between the first member 101 and the second member 102 so as to control transmission of the driving force. Specifically, this device is equipped with: a cylindrical movable body 104 forming an outer rotor structure having ferromagnetic property and arranged to be retractable and integrally rotatable with the second member 102, the cylindrical movable body advancing to thereby couple the second member 102 and the first member 101 to each other, or alternatively, retracting to thereby set the second member 102 and the first member 102 in an uncoupled state; a first magnetic path A and a second magnetic path B including the movable body 104, each of which is formed on an advancing side or a retracting side thereof; a permanent magnet 105 arranged in a position through which both of the first magnetic path A and the second magnetic path pass, the permanent magnet attracting and holding the movable body 4 to the first member 101 side by a magnetic flux H1 which is generated along the first magnetic path A when the movable body 104 is set on the first member 101 side shown in FIG. 10, or alternatively, attracting and holding the movable body 104 to the opposite side of the first member 101 by a magnetic flux H2 which is generated in the second magnetic path B when the movable body 104 is set on the opposite side of the first member 101 shown in FIG. 11; an electromagnet 106 arranged in one location in a position in which, when the permanent magnet 105 has been excited in the forward direction and the reverse direction with respect to a magnetic flux H1 which is generated in the first magnetic path A in which the magnetic flux is increased or decreased by the magnetic fluxes H3, H4; and a signal amplifying portion D which is a driving portion, in which the electromagnet 106 is excited in the forward direction to thereby generate a magnetic flux H3 to increase an attraction force on the first magnetic path A side on which the magnetic flux is increased or decreased and then draw the armature 4 that has been attracted and held on the second magnetic path B side on the opposite side to that on which the magnetic flux is increased or decreased, as shown in FIG. 11 to FIG. 10, and the electromagnet 106 is excited in the reverse direction to thereby generate a magnetic flux H4 to reduce a holding force of the armature 4 attracted and held on the first magnetic path A side on which the magnetic flux is increased or decreased and then space the armature 4 as shown in FIG. 10 to FIG. 11 by an attracting force exerted by the magnetic flux H2 on the second magnetic path B side on the opposite side to that on which the magnetic flux is increased or decreased, and is configured to switch the signal amplifying portion D by a control portion C.

According to such a configuration, advantageous effects similar to those of the embodiment are attained.

In respect of other configurations as well, a variety of modifications can occur without departing from the spirit of the present invention.

DESCRIPTION OF REFERENCE NUMERALS

1 . . . First member (output shaft)
2 . . . Second member (input shaft)
4 . . . Movable body (armature)
5 . . . Permanent magnet
6 . . . Electromagnet
A . . . First magnetic path
B . . . Second magnetic path
C . . . Control portion
D . . . Driving portion (signal amplifying portion)
H1 . . . Magnetic flux which permanent magnet generates in first magnetic path
H2 . . . Magnetic flux which permanent magnet generates in second magnetic path
H3 . . . Magnetic flux to increase magnetic flux H1
H4 . . . Magnetic flux to decrease magnetic flux H1

The invention claimed is:

1. A power transmission device to switch a coupled state and an uncoupled state between a first member and a second member which are arranged in a transmission path of a driving force to thereby control transmission of the driving force, the device comprising:
a movable body having ferromagnetic property and arranged to be retractable and integrally rotatable at the second member, the movable body advancing to thereby set the coupled state between the first member and the second member, or alternatively, retracting to thereby set the uncoupled state between the first member and the second member;
a first magnetic path and a second magnetic path including the movable body, each of which is formed on an advancing side or a retracting side of the movable body,
a permanent magnet arranged in one location in a position through which both of the first magnetic path and the second magnetic path pass, the permanent magnet attracting and holding the movable body at a first member side by a magnetic flux which is generated along the first magnetic path when the movable body is set on the first member side, or alternatively, attracting and holding the movable body on an opposite side to the first member side by a magnetic flux which is generated along the second magnetic path when the movable body is set on the opposite side to the first member side;
an electromagnet arranged in one location in a position at which the permanent magnet is excited in a forward position or a reverse direction with respect to a magnetic flux which is generated at either the first magnetic path or the second magnetic path to thereby increase or decrease the electromagnet; and a driving portion to excite the electromagnet in the forward direction and then increases an attraction force on a side on which a magnetic flux is increased or decreased, to thereby draw the movable body that has been attracted and held on an opposite side to the side on which the magnetic flux is increased or decreased, or alternatively, to excite the electromagnet in the reverse direction and then reduce a holding force of the movable body which has been attracted and held on the side on which the magnetic flux is increased or decreased, to thereby space the movable body by an attraction force exerted by the magnetic flux on the opposite side to the side on which the magnetic flux is increased or decreased.

2. The power transmission device according to claim 1, wherein, when the electromagnet is excited in the forward direction, a holding force is simultaneously reduced with respect to the movable body that has been attracted and held by a magnetic flux on an opposite side to a side on which the magnetic flux is increased or decreased, and when the electromagnetic is excited in the reverse direction, an attraction force is simultaneously increased while being exerted by the magnetic flux on the opposite side to the side on which the magnetic flux is increased or decreased.

3. The power transmission device according to claim 1, wherein the magnetic flux exerted by the electromagnet is generated along the magnetic path on the side on which the magnetic flux is increased or decreased.

4. The power transmission device according to claim 3, wherein, with respect to a magnetic path on the side on which the magnetic path is increased or decreased by the electromagnet, a magnetic path length of a magnetic path is reduced on the opposite side to the side on which the magnetic flux is increased or decreased.

5. The power transmission device according to claim 1, wherein a mechanical spring is provided in a position in which spacing of the movable body is accelerated when the electromagnet weakens the magnetic flux.

* * * * *